(12) United States Patent
Brewer et al.

(10) Patent No.: US 11,789,885 B2
(45) Date of Patent: *Oct. 17, 2023

(54) ORDERED DELIVERY OF DATA PACKETS BASED ON TYPE OF PATH INFORMATION IN EACH PACKET

(71) Applicant: Micron Technology, Inc., Boise, ID (US)

(72) Inventors: Tony Brewer, Plano, TX (US); David Patrick, McKinney, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/866,130

(22) Filed: Jul. 15, 2022

(65) Prior Publication Data

US 2022/0350768 A1  Nov. 3, 2022

Related U.S. Application Data

(63) Continuation of application No. 17/007,247, filed on Aug. 31, 2020, now Pat. No. 11,392,527.

(51) Int. Cl.
*G06F 13/40* (2006.01)
*G06F 9/46* (2006.01)

(52) U.S. Cl.
CPC ........ *G06F 13/4027* (2013.01); *G06F 9/467* (2013.01); *G06F 2213/0038* (2013.01); *G06F 2213/3808* (2013.01)

(58) Field of Classification Search
CPC ............. G06F 13/4027; G06F 9/467; G06F 2213/0038; G06F 2213/3808
See application file for complete search history.

(56) References Cited

U.S. PATENT DOCUMENTS 5,517,500 A * 5/1996 White ............... H04L 12/56
370/392
8,122,229 B2  2/2012 Wallach et al.
(Continued)

FOREIGN PATENT DOCUMENTS

EP  2774334 B1  1/2020
EP  3664383 A1  6/2020
(Continued)

OTHER PUBLICATIONS

"International Application Serial No. PCT/US2021/039519, International Search Report dated Oct. 14, 2021", 3 pgs.
(Continued)

*Primary Examiner* — Nimesh G Patel
(74) *Attorney, Agent, or Firm* — Schwegman Lundberg & Woessner, P.A.

(57) ABSTRACT

A system may include multiple electronic devices and multiple hardware transceivers. The multiple electronic devices may be coupled to each other via an interface network, and may include multiple chiplets. The multiple hardware transceivers, with at least one transceiver included in or coupled to a respective electronic device of the multiple electronic devices, may each be configured to receive data packets from a source device. The data packets may each include a path field including path information indicating a path to a destination device and a bridge-type field including bridge-type information indicating a type of the path information in the path field. The source device and the destination device may each include a chiplet. The multiple hardware transceivers may each be further configured to transmit the received data packets to the destination device using the path information and the bridge-type information of each received data packet.

20 Claims, 6 Drawing Sheets

(56) References Cited

U.S. PATENT DOCUMENTS

| | | |
|---|---|---|
| 8,423,745 B1 | 4/2013 | Brewer |
| 9,710,384 B2 | 7/2017 | Wallach et al. |
| 11,392,527 B2 | 7/2022 | Brewer et al. |
| 2007/0286152 A1* | 12/2007 | Prakash ............... H04L 61/6004 370/349 |
| 2010/0318882 A1 | 12/2010 | Cantillo et al. |
| 2012/0303528 A1 | 11/2012 | Weiner et al. |
| 2013/0114598 A1 | 5/2013 | Schrum et al. |
| 2013/0332711 A1 | 12/2013 | Leidel et al. |
| 2015/0206561 A1 | 7/2015 | Brewer et al. |
| 2018/0052685 A1 | 2/2018 | Ouyang et al. |
| 2019/0155779 A1* | 5/2019 | Dropps ............... G06F 13/4282 |
| 2019/0171604 A1 | 6/2019 | Brewer |
| 2019/0243700 A1* | 8/2019 | Brewer .................. H04L 69/18 |
| 2019/0288940 A1 | 9/2019 | Filsfils et al. |
| 2019/0303217 A1* | 10/2019 | Desai ................. G06F 9/4881 |
| 2019/0340027 A1 | 11/2019 | Brewer |
| 2019/0340035 A1 | 11/2019 | Brewer |
| 2019/0363989 A1 | 11/2019 | Shalev et al. |
| 2020/0059318 A1 | 2/2020 | Schulz |
| 2020/0293195 A1 | 9/2020 | Noy et al. |
| 2021/0064435 A1 | 3/2021 | Brewer |
| 2021/0303481 A1 | 9/2021 | Ray et al. |
| 2021/0312697 A1* | 10/2021 | Maiyuran ............... G06F 16/27 |
| 2022/0066971 A1 | 3/2022 | Brewer et al. |
| 2022/0070115 A1 | 3/2022 | Brewer et al. |

FOREIGN PATENT DOCUMENTS

| | | |
|---|---|---|
| WO | WO-2019089816 A3 | 4/2020 |
| WO | WO-2022046278 A1 | 3/2022 |
| WO | WO-2022046279 A1 | 3/2022 |

OTHER PUBLICATIONS

"International Application Serial No. PCT/US2021/039519, Written Opinion dated Oct. 14, 2021", 8 pgs.

"International Application Serial No. PCT/US2021/039524, International Search Report dated Oct. 14, 2021", 3 pgs.

"International Application Serial No. PCT/US2021/039524, Written Opinion dated Oct. 14, 2021", 5 pgs.

"International Application Serial No. PCT/US2021/039519, International Preliminary Report on Patentability dated Mar. 9, 2023", 10 pgs.

"International Application Serial No. PCT/US2021/039524, International Preliminary Report on Patentability dated Mar. 9, 2023", 7 pgs.

* cited by examiner

ORDERED DELIVERY OF DATA PACKETS BASED ON TYPE OF PATH INFORMATION IN EACH PACKET

PRIORITY APPLICATION

This application is a continuation of U.S. application Ser. No. 17/007,247, filed Aug. 31, 2020, which is incorporated herein by reference in its entirety.

BACKGROUND

Chiplets are an emerging technique for integrating various processing functionalities. Generally, a chiplet system is made up of discrete modules (each a "chiplet") that are integrated on an interposer, and in many examples interconnected as desired through one or more established networks, to provide a system with the desired functionality. The interposer and included chiplets may be packaged together to facilitate interconnection with other components of a larger system. Each chiplet may include one or more individual integrated circuits, or "chips" (ICs), potentially in combination with discrete circuit components, and commonly coupled to a respective substrate to facilitate attachment to the interposer. Most or all chiplets in a system will be individually configured for communication through the one or more established networks.

The configuration of chiplets as individual modules of a system is distinct from such a system being implemented on single chips that contain distinct device blocks (e.g., intellectual property (IP) blocks) on one substrate (e.g., single die), such as a system-on-a-chip (SoC), or multiple discrete packaged devices integrated on a printed circuit board (PCB). In general, chiplets provide better performance (e.g., lower power consumption, reduced latency, etc.) than discrete packaged devices, and chiplets provide greater production benefits than single die chips. These production benefits can include higher yields or reduced development costs and time.

Chiplet systems may include, for example, one or more application (or processor) chiplets and one or more support chiplets. Here, the distinction between application and support chiplets is simply a reference to the likely design scenarios for the chiplet system. Thus, for example, a synthetic vision chiplet system can include, by way of example only, an application chiplet to produce the synthetic vision output along with support chiplets, such as a memory controller chiplet, a sensor interface chiplet, or a communication chiplet. In a typical use case, the synthetic vision designer can design the application chiplet and source the support chiplets from other parties. Thus, the design expenditure (e.g., in terms of time or complexity) is reduced because by avoiding the design and production of functionality embodied in the support chiplets. Chiplets also support the tight integration of IP blocks that can otherwise be difficult, such as those manufactured using different processing technologies or using different feature sizes (or utilizing different contact technologies or spacings). Thus, multiple IC's or IC assemblies, with different physical, electrical, or communication characteristics may be assembled in a modular manner to provide an assembly providing desired functionalities. Chiplet systems can also facilitate adaptation to suit needs of different larger systems into which the chiplet system will be incorporated. In an example, IC's or other assemblies can be optimized for the power, speed, or heat generation for a specific function—as can happen with sensors—can be integrated with other devices more easily than attempting to do so on a single die. Additionally, by reducing the overall size of the die, the yield for chiplets tends to be higher than that of more complex, single die devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1A:
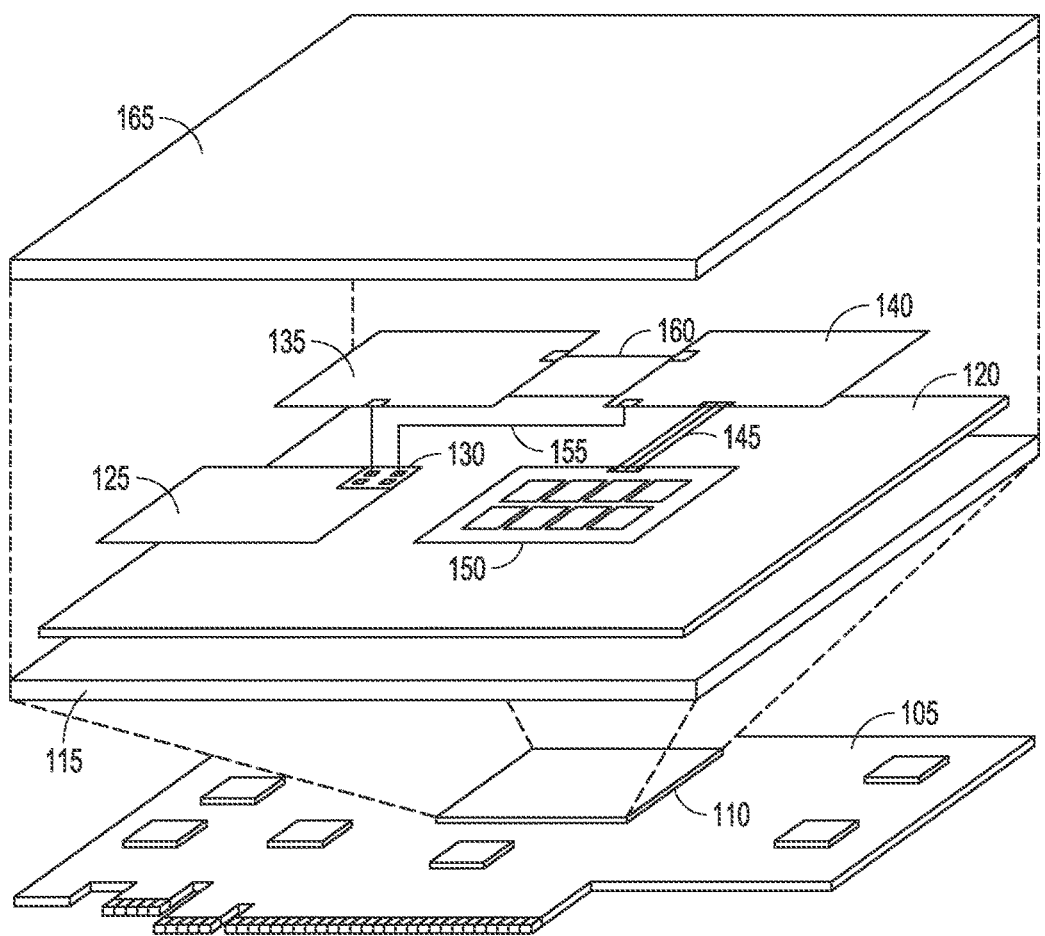
FIGS. 1A and 1B illustrate an example of a chiplet system, according to an embodiment.

FIG. 1, described below, offers an example of a chiplet system and the components operating therein. Within the context of such a chiplet system, data packets each have a path field, and the data packets having a common value in their path fields are ordered with respect to each other when being transmitted from a source endpoint (e.g., a chiplet) to a destination endpoint (e.g., another chiplet). Such data packets include request packets sent from the source endpoint (e.g., the requestor) to the destination device to initiate an operation at the destination endpoint. Some use cases require that the request packets containing the same address be ordered as they flow from the source endpoint to the destination endpoint. Some other use cases require that the request packets containing the same transaction identifier (TID) be ordered as they flow from the source endpoint to the destination endpoint. There may still be other use cases requiring that the request packets containing a common value in a specified field to be ordered as they flow from the source endpoint to the destination endpoint. Because different packet communication standards and protocols co-exist and are used by different device vendors, a network that supports only one of these use cases has limited applicability. Therefore, there is a need to support two or more of such use cases in the chiplet system.

The present subject matter supports ordered delivery of data packets, such as request packets, that have a common value in a specified field using another field in the data packets to indicate the type of information contained in the specified field, thereby supporting, for example, data packets sent from devices of different vendors using different standards and/or different protocols. In one example, request packets with a common value in a path field are ordered with respect to each other for delivery from the source endpoint to the destination endpoint. The path field of each request packet contains path information and can be populated with either the destination address (or part of that address) associated with the request packet or the requester's TID. The destination address and the TID are two types of the path information that are used by different protocols (e.g., used by different vendors) to identify the destination endpoint for delivering the request packet. Another field in each request packet, a bridge-type (BTYPE) field, indicates which of the types of the path information (the destination address or the TID) is used in that request packet.

The present subject matter supports both address-based ordering and transaction identifier-based ordering in transmission of data packets, such as request packets, on a packet-by-packet basis, between electronic devices such as chiplets. While the destination address and the TID are discussed in the present disclosure as examples of options or bridge types for bridging between different standards or protocols, the present subject matter can also apply to use cases with other options or bridge types indicating the destination endpoint for ordered delivery of data packets.

Figure 1B:
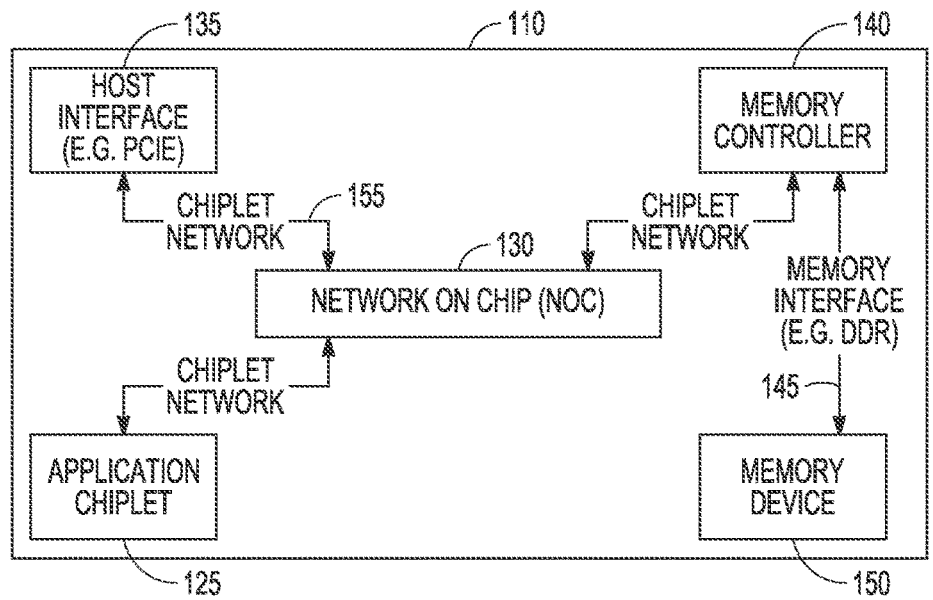

FIGS. 1A and 1B illustrate an example of a chiplet system 110, according to an embodiment. FIG. 1A is a representation of the chiplet system 110 mounted on a peripheral board 105, that can be connected to a broader computer system by a peripheral component interconnect express (PCIe), for example. The chiplet system 110 includes a package substrate 115, an interposer 120, and four chiplets, an application chiplet 125, a host interface chiplet 135, a memory controller chiplet 140, and a memory device chiplet 150. Other systems may include many additional chiplets to provide additional functionalities as will be apparent from the following discussion. The package of the chiplet system 110 is illustrated with a lid or cover 165, though other packaging techniques and structures for the chiplet system can be used. FIG. 1B is a block diagram labeling the components in the chiplet system for clarity.

The application chiplet 125 is illustrated as including a network-on-chip (NOC) 130 to support a chiplet network 155 for inter-chiplet communications. In example embodiments NOC 130 may be included on the application chiplet 125. In an example, NOC 130 may be defined in response to selected support chiplets (e.g., chiplets 135, 140, and 150) thus enabling a designer to select an appropriate number or chiplet network connections or switches for the NOC 130. In an example, the NOC 130 can be located on a separate chiplet, or even within the interposer 120. In examples as discussed herein, the NOC 130 implements a chiplet protocol interface (CPI) network.

The CPI is a packet-based network that supports virtual channels to enable a flexible and high-speed interaction between chiplets. CPI enables bridging from intra-chiplet networks to the chiplet network 155. For example, the Advanced eXtensible Interface (AXI) is a widely used specification to design intra-chip communications. AXI specifications, however, cover a great variety of physical design options, such as the number of physical channels, signal timing, power, etc. Within a single chip, these options are generally selected to meet design goals, such as power consumption, speed, etc. However, to achieve the flexibility of the chiplet system, an adapter, such as CPI, is used to interface between the various AXI design options that can be implemented in the various chiplets. By enabling a physical channel to virtual channel mapping and encapsulating time-based signaling with a packetized protocol, CPI bridges intra-chiplet networks across the chiplet network 155.

CPI can use a variety of different physical layers to transmit packets. The physical layer can include simple conductive connections, or can include drivers to increase the voltage, or otherwise facilitate transmitting the signals over longer distances. An example of one such physical layer can include the Advanced Interface Bus (AIB), which in various examples, can be implemented in the interposer 120. AIB transmits and receives data using source synchronous data transfers with a forwarded clock. Packets are transferred across the AIB at single data rate (SDR) or double data rate (DDR) with respect to the transmitted clock. Various channel widths are supported by AIB. AIB channel widths are in multiples of 20 bits when operated in SDR mode (20, 40, 60, . . . ), and multiples of 40 bits for DDR mode: (40, 80, 120, . . . ). The AIB channel width includes both transmit and receive signals. The channel can be configured to have a symmetrical number of transmit (TX) and receive (RX) input/outputs (I/Os), or have a non-symmetrical number of transmitters and receivers (e.g., either all transmitters or all receivers). The channel can act as an AIB principal or subordinate depending on which chiplet provides the master clock. AIB I/O cells support three clocking modes: asynchronous (i.e. non-clocked), SDR, and DDR. In various examples, the non-clocked mode is used for clocks and some control signals. The SDR mode can use dedicated SDR only I/O cells, or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half TX and half RX. CPI packet protocols can use an AIB channel in either SDR or DDR operation modes. In an example, the AIB channel is configured in increments of 80 I/O cells (i.e. 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIB channels across adjacent chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary channel. The auxiliary channel contains signals used for AIB initialization. All AIB channels (other than the auxiliary channel) within a column are of the same configuration (e.g., all TX, all RX, or half TX and half RX, as well as having the same number of data I/O signals). In an example, AIB channels are numbered in continuous increasing order starting with the AIB channel adjacent to the AUX channel. The AIB channel adjacent to the AUX is defined to be AIB channel zero.

AIB channels are typically configured as half TX data plus half RX data, all TX data, or all RX data plus associated clocks and miscellaneous control. The number of TX versus RX data signals is determined at design time and cannot be configured as part of system initialization, in some example embodiments.

The CPI packet protocols (point-to-point and routable) use symmetrical receive and transmit I/O cells within an AIB channel. The CPI streaming protocol allows more flexible use of the AIB I/O cells. An AIB channel for streaming mode may configure the I/O cells as all TX, all RX, or half TX and half RX, in some example embodiments.

Generally, CPI interfaces on individual chiplets can include serialization-deserialization (SERDES) hardware. SERDES interconnects work well for scenarios in which high-speed signaling with low signal count are desirable. SERDES, however, can result in additional power consumption and longer latencies for multiplexing and demultiplexing, error detection or correction (e.g., using block level cyclic redundancy checking (CRC)), link-level retry, or forward error correction. However, when low latency or energy consumption is a primary concern for ultra-short reach, chiplet-to-chiplet interconnects, a parallel interface with clock rates that allow data transfer with minimal latency may be utilized. CPI includes elements to minimize both latency and energy consumption in these ultra-short reach chiplet interconnects.

For flow control, CPI employs a credit-based technique. A recipient, such as the application chiplet 125, provides a sender, such as the memory controller chiplet 140, with credits that represent available buffers. In an example, a CPI recipient includes a buffer for each virtual channel for a given time-unit of transmission. Thus, if the CPI recipient supports five messages in time and a single virtual channel, the recipient has five buffers arranged in five entries (e.g., one entry for each unit time). If four virtual channels are supported, then the recipient has twenty buffers arranged in five entries. Each buffer holds the payload of one CPI packet.

When the sender transmits to the recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return that indicates buffer space available for the sender can then be used by the sender allow transmitting of additional information.

Also illustrated is a chiplet mesh network 160 that uses a direct, chiplet-to-chiplet technique without the need for the NOC 130. The chiplet mesh network 160 can be implemented in CPI, or another chiplet-to-chiplet protocol. The chiplet mesh network 160 generally enables a pipeline of chiplets where one chiplet serves as the interface to the pipeline while other chiplets in the pipeline interface only with themselves.

Additionally, dedicated device interfaces, such as one or more industry standard memory interfaces 145 (such as, for example, synchronous memory interfaces, such as DDR5, DDR6), can also be used to interconnect chiplets. Connection of a chiplet system or individual chiplets to external devices (such as a larger system can be through a desired interface (for example, a PCIE interface). Such as external interface may be implemented, in an example, through a host interface chiplet 135, which in the depicted example, provides a PCIE interface external to chiplet system 110. Such dedicated interfaces 145 are generally employed when a convention or standard in the industry has converged on such an interface. The illustrated example of a DDR interface 145 connecting the memory controller chiplet 140 to a dynamic random access memory (DRAM) memory device 150 is just such an industry convention.

Of the variety of possible support chiplets, the memory controller chiplet 140 is likely present in the chiplet system 110 due to the near omnipresent use of storage for computer processing as well as sophisticated state-of-the-art for memory devices. Thus, using memory device chiplets 150 and memory controller chiplets 140 produced by others gives chiplet system designers access to robust products by sophisticated producers. Generally, the memory controller chiplet 140 provides a memory device specific interface to read, write, or erase data. Often, the memory controller chiplet 140 can provide additional features, such as error detection, error correction, maintenance operations, or atomic operation execution. For some types of memory, maintenance operations tend to be specific to the memory device 150, such as garbage collection in NAND flash or storage class memories, temperature adjustments (e.g., cross temperature management) in NAND flash memories. In an example, the maintenance operations can include logical-to-physical (L2P) mapping or management to provide a level of indirection between the physical and logical representation of data. In other types of memory, for example DRAM, some memory operations, such as refresh may be controlled by a host processor or of a memory controller at some times, and at other times controlled by the DRAM memory device, or by logic associated with one or more DRAM devices, such as an interface chip (in an example, a buffer).

Atomic operations are a data manipulation that, for example, may be performed by the memory controller chiplet 140. In other chiplet systems, the atomic operations may be performed by other chiplets. For example, an atomic operation of "increment" can be specified in a command by the application chiplet 125, the command including a memory address and possibly an increment value. Upon receiving the command, the memory controller chiplet 140 retrieves a number from the specified memory address, increments the number by the amount specified in the command, and stores the result. Upon a successful completion, the memory controller chiplet 140 provides an indication of the commands success to the application chiplet 125. Atomic operations avoid transmitting the data across the chiplet network 160, resulting in lower latency execution of such commands.

Atomic operations can be classified as built-in atomics or programmable (e.g., custom) atomics. Built-in atomics are a finite set of operations that are immutably implemented in hardware. Programmable atomics are small programs that can run on a programmable atomic unit (PAU) (e.g., a custom atomic unit (CAU)) of the memory controller chiplet 140. FIG. 1 illustrates an example of a memory controller chiplet that discusses a PAU.

The memory device chiplet 150 can be, or include any combination of, volatile memory devices or non-volatile memories. Examples of volatile memory devices include, but are not limited to, random access memory (RAM)—such as DRAM) synchronous DRAM (SDRAM), graphics DDR type 6 SDRAM (GDDR6 SDRAM), among others. Examples of non-volatile memory devices include, but are not limited to, negative-and-(NAND)-type flash memory, storage class memory (e.g., phase-change memory or memristor based technologies), ferroelectric RAM (FeRAM), among others. The illustrated example includes the memory device 150 as a chiplet, however, the memory device 150 can reside elsewhere, such as in a different package on the board 105. For many applications, multiple memory device chiplets may be provided. In an example, these memory device chiplets may each implement one or multiple storage technologies. In an example, a memory chiplet may include, multiple stacked memory die of different technologies, for example one or more SRAM devices stacked or otherwise in communication with one or more DRAM devices. Memory controller 140 may also serve to coordinate operations between multiple memory chiplets in chiplet system 110; for example, to utilize one or more memory chiplets in one or more levels of cache storage, and to use one or more additional memory chiplets as main memory. Chiplet system 110 may also include multiple memory controllers 140, as may be used to provide memory control functionality for separate processors, sensors, networks, etc. A chiplet architecture, such as chiplet system 110 offers advantages in allowing adaptation to different memory storage technologies; and different memory interfaces, through updated chiplet configurations, without requiring redesign of the remainder of the system structure.

Figure 2:
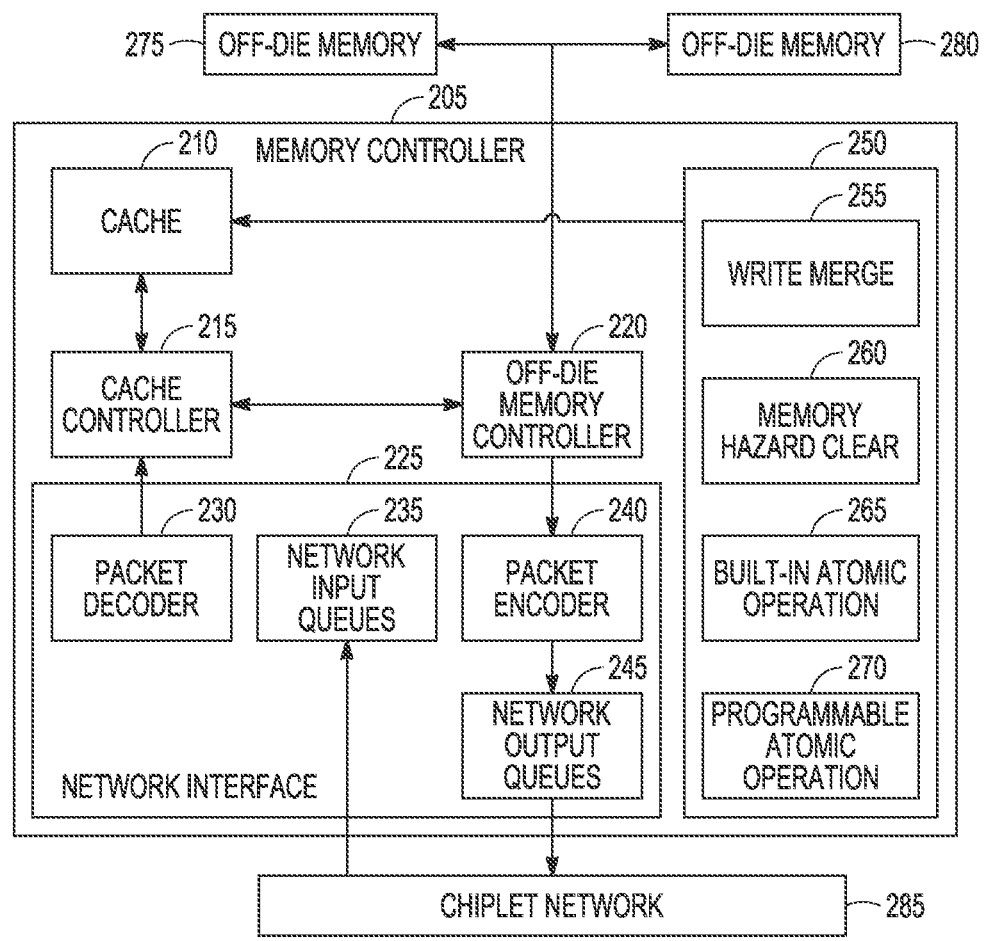
FIG. 2 illustrates components of an example of a memory controller chiplet, according to an embodiment.

FIG. 2 illustrates components of an example of a memory controller chiplet 205, according to an embodiment. The memory controller chiplet 205 includes a cache 210, a cache controller 215, an off-die memory controller 220 (e.g., to communicate with off-die memory 175), a network communication interface 225 (e.g., to interface with a chiplet network 180 and communicate with other chiplets), and a set of atomic and merge operations 250. Members of this set can include, for example, a write merge unit 155, a hazard unit (160), built-in atomic unit 165, or a PAU 170. The various components are illustrated logically, and not as they necessarily would be implemented. For example, the built-in atomic unit 165 likely comprises different devices along a path to the off-die memory. For example, the built-in atomic unit could be in an interface device/buffer on a memory chiplet, as discussed above. In contrast, the programmable atomic operations 170 are likely implemented in a separate processor on the memory controller chiplet 105 (but in various examples may be implemented in other locations, for example on a memory chiplet).

The off-die memory controller 220 is directly coupled to the off-die memory 275 (e.g., via a bus or other communication connection) to provide write operations and read operations to and from the one or more off-die memory, such as off-die memory 275 and off-die memory 280. In the depicted example, the off-die memory controller 220 is also coupled for output to the atomic and merge operations unit 250, and for input to the cache controller 215 (e.g., a memory side cache controller).

In the example configuration, cache controller 215 is directly coupled to the cache 210, and may be coupled to the network communication interface 225 for input (such as incoming read or write requests), and coupled for output to the off-die memory controller 220.

The network communication interface 225 includes a packet decoder 230, network input queues 235, a packet encoder 240, and network output queues 245 to support a packet-based chiplet network 285, such as CPI. The chiplet network 285 can provide packet routing between and among processors, memory controllers, hybrid threading processors, configurable processing circuits, or communication interfaces. In such a packet-based communication system, each packet typically includes destination and source addressing, along with any data payload or instruction. In an example, the chiplet network 285 can be implemented as a collection of crossbar switches having a folded Clos configuration, or a mesh network providing for additional connections, depending upon the configuration.

In various examples, the chiplet network 285 can be part of an asynchronous switching fabric. Here, a data packet can be routed along any of various paths, such that the arrival of any selected data packet at an addressed destination can occur at any of multiple different times, depending upon the routing. Additionally, chiplet network 285 can be implemented at least in part as a synchronous communication network, such as a synchronous mesh communication network. Both configurations of communication networks are contemplated for use for examples in accordance with the present disclosure.

The memory controller chiplet 205 can receive a packet having, for example, a source address, a read request, and a physical address. In response, the off-die memory controller 220 or the cache controller 215 will read the data from the specified physical address (which can be in the off-die memory 275 or in the cache 210), and assemble a response packet to the source address containing the requested data. Similarly, the memory controller chiplet 205 can receive a packet having a source address, a write request, and a physical address. In response, the memory controller chiplet 205 will write the data to the specified physical address (which can be in the cache 210 or in the off-die memories 275 or 280), and assemble a response packet to the source address containing an acknowledgement that the data was stored to a memory.

Thus, the memory controller chiplet 205 can receive read and write requests via the chiplet network 285 and process the requests using the cache controller 215 interfacing with the cache 210, if possible. If the request cannot be handled by the cache controller 215, the off-die memory controller 220 handles the request by communication with the off-die memories 275 or 280, the atomic and merge operations 250, or both. As noted above, one or more levels of cache may also be implemented in off-die memories 275 or 280; and in some such examples may be accessed directly by cache controller 215. Data read by the off-die memory controller 220 can be cached in the cache 210 by the cache controller 215 for later use.

The atomic and merge operations 250 are coupled to receive (as input) the output of the off-die memory controller 220, and to provide output to the cache 210, the network communication interface 225, or directly to the chiplet network 285. The memory hazard clear (reset) unit 260, write merge unit 265 and the built-in (e.g., predetermined) atomic operations unit 265 can each be implemented as state machines with other combinational logic circuitry (such as adders, shifters, comparators, AND gates, OR gates, XOR gates, or any suitable combination thereof) or other logic circuitry. These components can also include one or more registers or buffers to store operand or other data. The PAU 270 can be implemented as one or more processor cores or control circuitry, and various state machines with other combinational logic circuitry or other logic circuitry, and can also include one or more registers, buffers, or memories to store addresses, executable instructions, operand and other data, or can be implemented as a processor.

The write merge unit 255 receives read data and request data, and merges the request data and read data to create a single unit having the read data and the source address to be used in the response or return data packet). The write merge unit 255 provides the merged data to the write port of the cache 210 (or, equivalently, to the cache controller 215 to write to the cache 210). Optionally, the write merge unit 255 provides the merged data to the network communication interface 225 to encode and prepare a response or return data packet for transmission on the chiplet network 280.

When the request data is for a built-in atomic operation, the built-in atomic operations unit 265 receives the request and reads data, either from the write merge unit 265 or directly from the off-die memory controller 220. The atomic operation is performed, and using the write merge unit 255, the resulting data is written to the cache 210, or provided to the network communication interface 225 to encode and prepare a response or return data packet for transmission on the chiplet network 285.

The built-in atomic operations unit 265 handles predefined atomic operations such as fetch-and-increment or compare-and-swap. In an example, these operations perform a simple read-modify-write operation to a single memory location of 32-bytes or less in size. Atomic memory operations are initiated from a request packet transmitted over the chiplet network 285. The request packet has a physical address, atomic operator type, operand size, and optionally up to 32-bytes of data. The atomic operation performs the read-modify-write to a cache memory line of the cache 210, filling the cache memory if necessary. The atomic operator response can be a simple completion response, or a response with up to 32-bytes of data. Example atomic memory operators include fetch-and-AND, fetch-and-OR, fetch-and-XOR, fetch-and-add, fetch-and-subtract, fetch-and-increment, fetch-and-decrement, fetch-and-minimum, fetch-and-maximum, fetch-and-swap, and compare-and-swap. In various example embodiments, 32-bit and 64-bit operations are supported, along with operations on 16 or 32 bytes of data. Methods disclosed herein are also compatible with hardware supporting larger or smaller operations and more or less data.

Built-in atomic operations can also involve requests for a "standard" atomic operation on the requested data, such as comparatively simple, single cycle, integer atomics—such as fetch-and-increment or compare-and-swap—which will occur with the same throughput as a regular memory read or write operation not involving an atomic operation. For these operations, the cache controller 215 may generally reserve a cache line in the cache 210 by setting a hazard bit (in hardware), so that the cache line cannot be read by another process while it is in transition. The data is obtained from either the off-die memory 275 or the cache 210, and is provided to the built-in atomic operation unit 265 to perform the requested atomic operation. Following the atomic operation, in addition to providing the resulting data to the data packet encoder 240 to encode outgoing data packets for transmission on the chiplet network 285, the built-in atomic operation unit 265 provides the resulting data to the write merge unit 255, which will also write the resulting data to the cache circuit 210. Following the writing of the resulting data to the cache 210, any corresponding hazard bit which was set will be cleared by the memory hazard clear unit 260.

The PAU 270 enables high performance (high throughput and low latency) for programmable atomic operations (also referred to as "custom atomic operations"), comparable to the performance of built-in atomic operations. Rather than executing multiple memory accesses, in response to an atomic operation request designating a programmable atomic operation and a memory address, circuitry in the memory controller chiplet 205 transfers the atomic operation request to PAU 270 and sets a hazard bit stored in a memory hazard register corresponding to the memory address of the memory line used in the atomic operation, to ensure that no other operation (read, write, or atomic) is performed on that memory line, which hazard bit is then cleared upon completion of the atomic operation. Additional, direct data paths provided for the PAU 270 executing the programmable atomic operations allow for additional write operations without any limitations imposed by the bandwidth of the communication networks and without increasing any congestion of the communication networks.

The PAU 270 includes a multi-threaded processor, for example, such as a RISC-V ISA based multi-threaded processor, having one or more processor cores, and further having an extended instruction set for executing programmable atomic operations. When provided with the extended instruction set for executing programmable atomic operations, the PAU 270 can be embodied as one or more hybrid threading processors. In some example embodiments, the PAU 270 provides barrel-style, round-robin instantaneous thread switching to maintain a high instruction-per-clock rate.

Programmable atomic operations can be performed by the PAU 270 involving requests for a programmable atomic operation on the requested data. A user can prepare programming code to provide such programmable atomic operations. For example, the programmable atomic operations can be comparatively simple, multi-cycle operations such as floating-point addition, or comparatively complex, multi-instruction operations such as a Bloom filter insert. The programmable atomic operations can be the same as or different than the predetermined atomic operations, insofar as they are defined by the user rather than a system vendor. For these operations, the cache controller 215 can reserve a cache line in the cache 210, by setting a hazard bit (in hardware), so that cache line cannot be read by another process while it is in transition. The data is obtained from either the cache 210 or the off-die memories 275 or 280, and is provided to the PAU 270 to perform the requested programmable atomic operation. Following the atomic operation, the PAU 270 will provide the resulting data to the network communication interface 225 to directly encode outgoing data packets having the resulting data for transmission on the chiplet network 285. In addition, the PAU 270 will provide the resulting data to the cache controller 215, which will also write the resulting data to the cache 210. Following the writing of the resulting data to the cache 210, any corresponding hazard bit which was set will be cleared by the cache control circuit 215.

In selected examples, the approach taken for programmable atomic operations is to provide multiple, generic, custom atomic request types that can be sent through the chiplet network 285 to the memory controller chiplet 205 from an originating source such as a processor or other system component. The cache controllers 215 or off-die memory controller 220 identify the request as a custom atomic and forward the request to the PAU 270. In a representative embodiment, the PAU 270: (1) is a programmable processing element capable of efficiently performing a user defined atomic operation; (2) can perform load and stores to memory, arithmetic and logical operations and control flow decisions; and (3) leverages the RISC-V ISA with a set of new, specialized instructions to facilitate interacting with such controllers 215, 220 to atomically perform the user-defined operation. In desirable examples, the RISC-V ISA contains a full set of instructions that support high level language operators and data types. The PAU 270 can leverage the RISC-V ISA, but will commonly support a more limited set of instructions and limited register file size to reduce the die size of the unit when included within the memory controller chiplet 205.

As mentioned above, prior to the writing of the read data to the cache 210, the set hazard bit for the reserved cache line is to be cleared, by the memory hazard clear unit 260. Accordingly, when the request and read data is received by the write merge unit 255, a reset or clear signal can be transmitted by the memory hazard clear unit 260 to the cache 210 to reset the set memory hazard bit for the reserved cache line. Also, resetting this hazard bit will also release a pending read or write request involving the designated (or reserved) cache line, providing the pending read or write request to an inbound request multiplexer for selection and processing.

Figure 3:
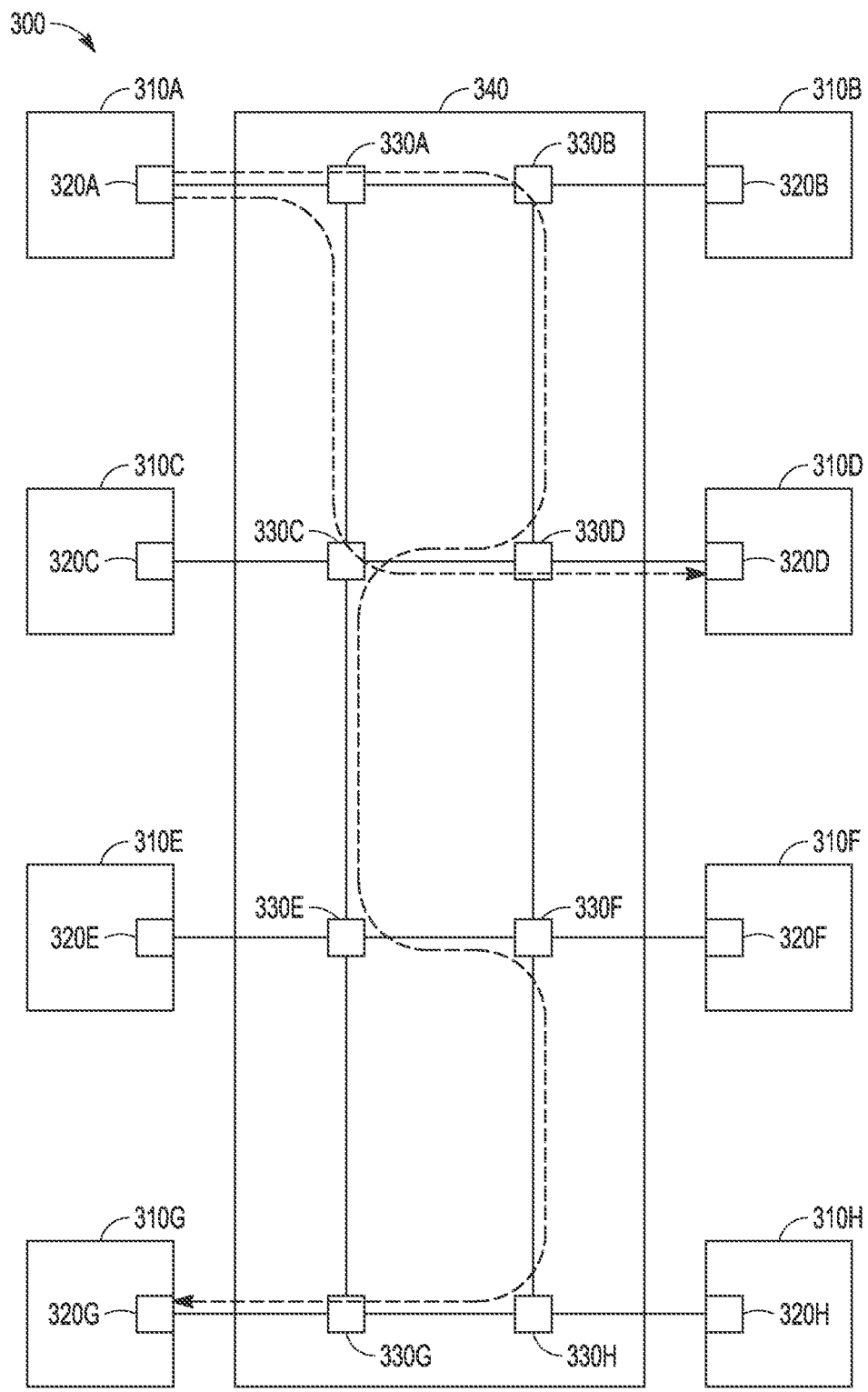
FIG. 3 illustrates an example of routing between electronic devices in a device layout using an interface network, such as between chiplets in a chiplet layout using a chiplet protocol interface (CPI) network, according to an embodiment.

FIG. 3 illustrates an example of routing between electronic devices in a device layout 300 using an interface network, such as between chiplets in a chiplet layout 300 using a chiplet protocol interface (CPI) network, according to an embodiment. The device layout 300 includes electronic devices, which in the present example may include one or more electronic devices in the form of an individual chiplet, 310A, 310B, 310C, 310D, 310E, 310F, 310G, and 310H, which are interconnected by a network comprising nodes 330A, 330B, 330C, 330D, 330E, 330F, 330G, and 330H. The nodes 330A-330H can be housed in a NOC 340 that is a separate chiplet or part of another chiplet (e.g., NOC 130 of FIG. 1 is illustrated as part of the application chiplet 125) or the nodes 330A-330H can be distributed in other structures of a chiplet system, such as in one or more of the chiplets 310A-310H. Each node may include one or more switches and/or transceivers, arranged and controlled to provide communications as described herein. The electronic devices 310A-310H each include one of hardware transceivers 320A-320H. In one embodiment, the electronic devices 310A-310H are each a chiplet, and the network is the CPI network. Thus, the device layout (or chiplet layout) 300 includes chiplets 310A, 310B, 310C, 310D, 310E, 310F, 310G, and 310H, which are interconnected by the CPI network comprising nodes 330A, 330B, 330C, 330D, 330E, 330F, 330G, and 330H. The chiplets 310A-310H each include one of the hardware transceivers 320A-320H.

CPI packets can be transferred between the chiplets 310 using an Advanced Interface Bus (AIB). The AIB provides physical layer functionality. The physical layer transmits and receives data using source synchronous data transfers with a forwarded clock. Packets are transferred across the AIB at SDR or DDR with respect to the transmitted clock. Various channel widths are supported by the AIB. AIB channel widths are in multiples of 20 bits when operated in SDR mode (20, 40, 60, . . . ), and 40 bits for DDR mode: (40, 80, 120, . . . ). The AIB channel width includes both transmit and receive signals. The channel may be configured to have a symmetrical number of transmit (TX) and receive (RX) input/outputs (I/Os), or have a non-symmetrical number of transmitters and receivers (e.g., either all transmitters or all receivers).

The AIB adapter provides an interface to the AIB link layer and an interface to the AIB physical layer (PHY). The AIB adapter provides data staging registers, power-on reset sequencers, and a control signal shift register.

The AIB physical layer consists of AIB I/O Cells. AIB I/O cells (implemented, in some example embodiments, by the hardware transceivers 320) may be input only, output only or bidirectional. An AIB channel is composed of a set of AIB I/O cells, the number of cells is dependent on the configuration of the AIB channel. The receive signals on one chiplet are connected to the transmit signals on the paired chiplet. In some example embodiments, each column comprises an auxiliary (AUX) channel and data channels numbered 0 to N.

Data packets are routed among the chiplets 310 by the network nodes 330. A node 330 may determine the next node 330 to forward a received data packet to based on one or more data fields of the data packet. For example, a source or destination address, source or destination port, virtual channel, or any suitable combination thereof may be hashed to select a successive network node or an available network path. Selecting paths in this way may serve to balance network traffic.

Thus, in FIG. 3, a data path is shown from the chiplet 310A to the chiplet 310D. The data packet is sent by the hardware transceiver 320A to the network node 330A; forwarded by the network node 330A to the network node 330C; forwarded by the network node 330C to the network node 330D; and delivered by the network node 330D to the hardware transceiver 320D of the chiplet 310D.

A second data path is also shown in FIG. 3, from the chiplet 310A to the chiplet 310G. The data packet is sent by the hardware transceiver 320A to the network node 330A; forwarded by the network node 330A to the network node 330B; forwarded by the network node 330B to the network node 330D; forwarded by the network node 330D to the network node 330C; forwarded by the network node 330C to the network node 330E; forwarded by the network node 330E to the network node 330F; forwarded by the network node 330F to the network node 330H; forwarded by the network node 330H to the network node 330G; and delivered by the network node 330G to the hardware transceiver 320G of the chiplet 310G. As is visually apparent in FIG. 3, multiple paths through the network are available for transmission of data between any pair of chiplets.

AIB I/O cells support three clocking modes: asynchronous (i.e. non-clocked), SDR, and DDR. The non-clocked mode is used for clocks and some control signals. The SDR mode may use dedicated SDR only I/O cells, or dual use SDR/DDR I/O cells.

CPI packet protocols (point-to-point and routable) may use an AIB channel in either SDR or DDR operation modes. In some example embodiments, the AIB channel shall be is in increments of 80 I/O cells (i.e. 40 TX and 40 RX) for SDR mode and 40 I/O cells for DDR mode.

CPI streaming protocol may use an AIB channel in either SDR or DDR operation modes. In some example embodiments, for both modes (SDR and DDR) the AIB channel is in increments of 40 I/O cells.

Each AIB channel is assigned a unique interface identifier. The identifier is used during CPI reset and initialization to determine paired AIB channels across adjacent chiplets. In some example embodiments, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

In some example embodiments, AIB channels are numbered in continuous increasing order starting with the AIB channel adjacent to the AUX channel. The AIB channel adjacent to the AUX is defined to be AIB channel zero.

FIG. 3, by way of example, shows eight chiplets 310 connected by a network comprising eight nodes 330. More or fewer chiplets 310 and more or fewer nodes 330 may be included in the chiplet network, allowing a network of chiplets of arbitrary size to be created.

The data packets can be transmitted between the electronic devices (such as chiplets) 310 via the interface network (such as the CPI network) according to path and ordering requirements specified on a packet-by-packet basis. In various embodiments, data packets generated from electronic devices provided by different vendors can follow different standards and/or protocols. For example, the data packets each include a path field containing path information that can be used to route that data packet to its destination endpoint. However, data packets following different protocols can have different type of path information in the path field. For example, the path field of a data packet following the CPI protocol contains a portion of the destination device address associated with that data packet, while the path field of a data packet following the Advance eXtensible Interface (AXI) protocol contains the transaction identifier (TID) associated with that data packet. The present subject matter provides for bridging between such different types of path information for ordered delivery of the data packets in a network, such as the CPI network as discussed in the present disclosure. In various embodiments, the path information and the type of path information are specified in each data packet being transmitted, such that the network can support multiple use cases with different requirements on how path information is specified.

Figure 4:
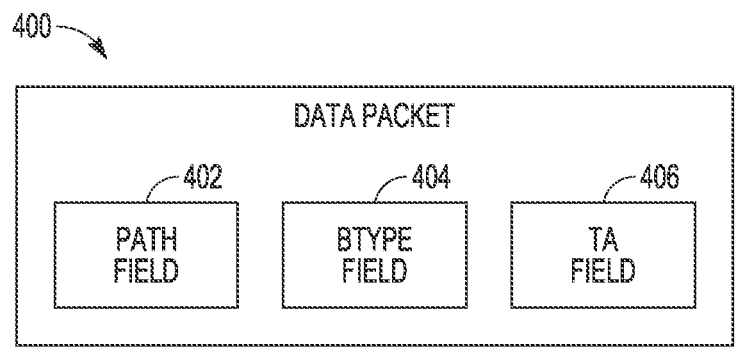
FIG. 4 is a block diagram of a data packet suitable for use in a system for transmitting data packets having different types of path information in their path fields, in accordance with some embodiments of the present disclosure.

FIG. 4 is a block diagram of a data packet 400 suitable for use in a system transmitting data packets having different type of path information in their path fields, in accordance with some embodiments of the present disclosure. The system can include multiple electronic devices (e.g., the electronic devices 310A-310H) coupled to each other via the interface network (e.g., including nodes 330A-330H) and multiple hardware transceivers (e.g., the hardware transceivers 320A-320H) each included in or coupled to an electronic device of the multiple electronic devices. The multiple hardware transceivers can each receive data packets from a source device of the multiple electronic devices and transmit the received data packets to a destination device of the multiple electronic devices. These data packet can each be an instance of the data packet 400.

The data packet 400 includes a path (PATH) field 402, a bridge-type (BTYPE) field 404, a transaction identifier/address (TA) field 406, and one or more additional fields containing any types of data for the operation of the system. The PATH field 402 contains path information indicating the path over which the data packet 400 is to be delivered to the destination device. The BTYPE field 404 contains bridge-type information indicating a type of the path information in the path field. The type of the path information can be, for example, the address of the destination device or the TID associated with the data packet 400. The address in the PATH field 402 can be part of the address of the destination device, with remaining part of the address contained in one or more additional fields of the data packet 400. For example, the address can be a subfield of a memory location address of the destination device (packets for accessing different memory locations on the same device can take different paths). The information in the PATH field 402 can be part of the TID, with remaining part of the TID contained in one or more additional fields of the data packet 400. The TA field 406 includes the TID or the address of the destination device, depending on the value of the BTYPE field.

If the value of the BTYPE field 404 indicates that the PATH field 402 contains the address, the TA field 406 contains the TID. If the value of the BTYPE field 404 indicates that the PATH field 402 contains the TID, the TA field 406 contains the address (which can be part of the address of the destination device).

After receiving each data packet 400, a hardware transceiver can transmit it to the destination device using at least the path information and the bridge-type information contained in that data packet. The data packet 400 can be a request packet for initiating an operation in the destination device. Request packets having a common value in their PATH field 402 and a common value in their BTYPE field 404 are ordered with respect to each other in their delivery to the destination device. By using request packets having the format as illustrated by the data packet 400, the interface network, such as the CPI network, can support both address-based ordering and TID-based ordering, on a packet-by-packet basis.

Figure 5:
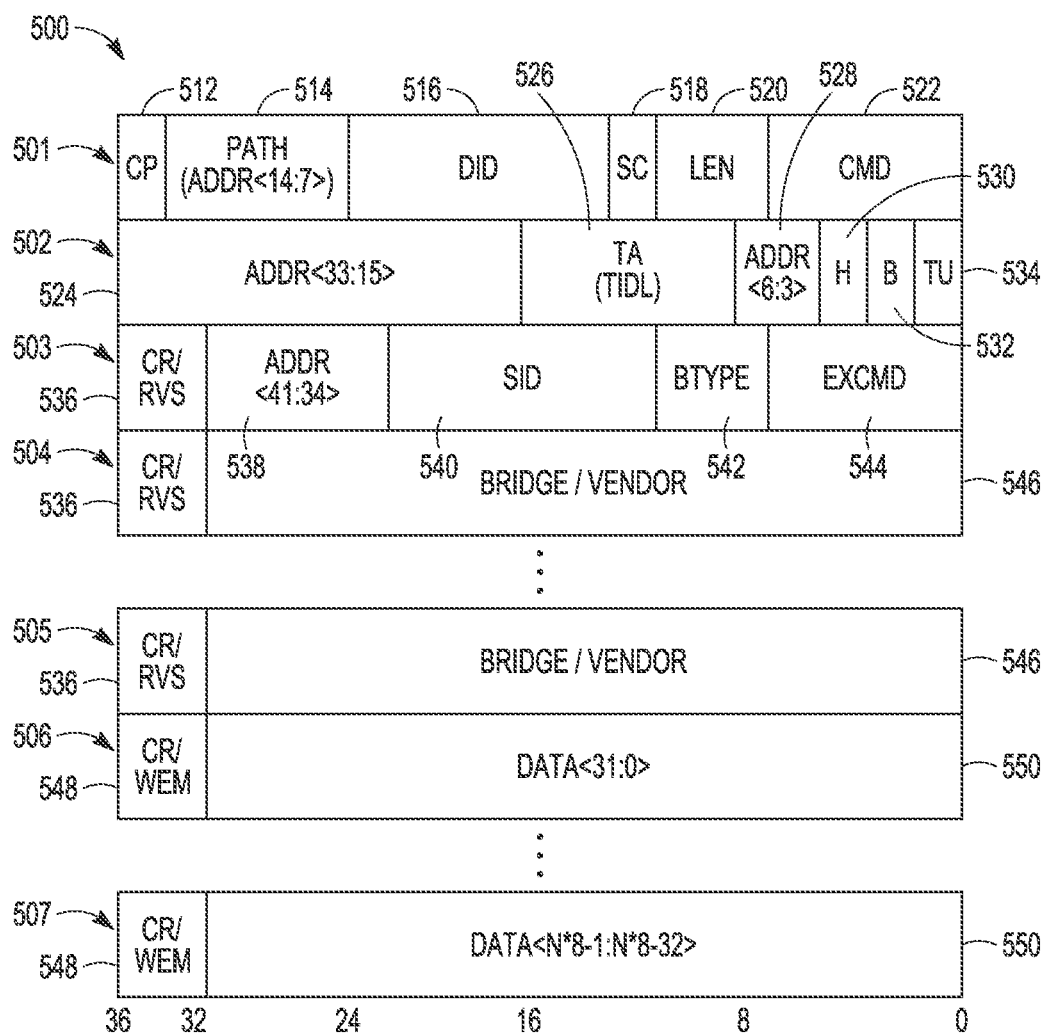
FIG. 5 is a block diagram of a data packet being a specific example of the data packet of FIG. 4, in accordance with some embodiments of the present disclosure.

FIG. 5 is a block diagram of a data packet 500 being a specific example of the data packet 400, in accordance with some embodiments of the present disclosure. The data packet 500 can represent an example of the data packet 400 when used in packet transmission in the CPI network. As illustrated in FIG. 5, the data packet 500 is divided into flow control units (flits) each being composed of 36 bits. A first flit 501 of the data packet 500 includes a chiplet protocol (CP) field 512, a path (PATH) field 514, a destination identifier (DID) field 516, a sequence continue (SC) field 518, a length (LEN) field 520, and a command (CMD) field 522. A second flit 502 of the data packet 500 includes an address (ADDR) field 524, a TID/address (TA) field 526, another ADDR field 528, an H field 530, a B field 532, and a TU field 534. A third flit 503 of the data packet 500 includes a credit return (CR)/reserve (RSV) field 536, another ADDR field 538, a source identifier (SID) field 540, a bridge-type (BTYPE) field 542, and an external command (EXCMD) field 544. Flits 504 and 505 (following the flit 503 and with any number of similar flits in between) each include the CR/RSV field 536 and a bridge/vendor (BRIDGE/VENDOR) field 546. Flits 506 and 507 (following the flit 505 and with any number of similar flits in between) each include a credit return (CR)/write enable mask (WEM) field 548 and a data (DATA) field 550. The data packet 500 is illustrated in FIG. 5 and discussed herein by way of example, but not by way of restriction. In various embodiments, the data packets suitable for use according to the present subject matter each include at least the PATH field 514, the BTYPE field 542, and one or more other fields to provide the complete information required for the delivery of the packets (e.g., the TA field 526).

The CP field 512 is a two-bit field that indicates whether the CR/RSV field 536 contains CR data, RSV data, or should be ignored, whether the CR/WEM field 548 contains CR data, WEM data, or should be ignored, and whether the PATH field 514 should be used to control ordering of the data packets being transmitted. For example, the CP field 512 can indicate whether the data packet 500 is to be transmitted to the destination device using an unordered delivery, an ordered delivery using the path information on the PATH field 514, or an ordered delivery through a single predetermined (e.g., default) path.

The PATH field 514, which can represent an example of the PATH field 402, is an eight-bit field that contains the path information, with the type of the path information indicated in the BTYPE field 542. When the path information contained in the PATH field 514 is used to determine the path for delivery, all the data packets 500 having the same value and the same type of the path information in the PATH field 514 are transmitted by ordered delivery to the destination device through the interface network. As a result, the order of these data packets 500 remain unchanged during their transmission between the source device and the destination device. The type of the path information can include part of the address of the destination device (bits 7 to 14 in the illustrated example) or the TID associated with the data packet 500 being transmitted. In one example, if the value of the BTYPE field 542 is 0, the PATH field 514 contains the part of the address of the destination device. If the value of the BTYPE field 542 is 1, the PATH field 514 contains the TID. Values 2 and greater for the BTYPE field 542 can be reserved for potential future use to accommodate other one or more options. When not needed for another use, if the value of the BTYPE field 542 is 2 or greater, the PATH field 514 can contain the part of the address of the destination device as a default.

The DID field 516 stores a twelve-bit DID. The DID uniquely identifies a destination in the network (e.g., a destination chiplet). A sequence of the data packets 500 all having the SC field 525 set are guaranteed to be delivered in order. The LEN field 520 is a five-bit field that indicates the number of flits included in the data packet 500. Interpretation of the length field 520 may be non-linear. For example, values 0-22 may be interpreted as 0-22 flits in the data packet 500 and values 23-27 may be interpreted as 33-37 flits in the data packet 500 (i.e., 10 more than the indicated value). Other values of the length field 530 may be vendor defined instead of protocol defined.

The command for the data packet 500 is stored in the CMD field 522, which is a seven-bit field. The command may be a write command, a read command, a predefined atomic operation command, a custom atomic operation command, a read response, an acknowledge response, or a vendor-specific command. Additionally, the command may indicate a virtual channel of the data packet 500. For example, different commands may be used for different virtual channels or 1, 2, 3, or 4 bits of the seven-bit command field 535 may be used to indicate the virtual channel and the remaining bits may be used to indicate the command.

The memory access commands may further identify a number of bytes to be written or accessed, a memory space to access (e.g., the off-die memory 375 or an instruction memory for custom atomic operations), or any suitable combination thereof. In some example embodiments, the command may indicate that additional bits of a later flit identify the command. For example, a large data transfer command could be sent by using a vendor-specific command in the seven-bit CMD field 522 and using a portion or all of another one or more fields (e.g., DATA fields 550) to contain the larger command.

The ADDR fields 524, 528, and 538 can each contain a part of the address of the destination device when needed. In the illustrated example, the ADDR fields 524, 528, and 538 contain bits 15 to 33, 3 to 6, and 34 to 41, respectively.

Content of the TA field 526, which can represent an example of the TA field 406, depends on the bridge-type information in the BTYPE field 542. If the bridge-type information in the BTYPE field 542 indicates that the PATH field 514 contains the part of the address of the destination device associated with the data packet 500 being transmitted, the TA field 526 contains the TID associated with the data packet 500 being transmitted. If the bridge-type information in the BTYPE field 542 indicates that the PATH field 514 contains the TID, the TA field 526 contains the part of the address (bits 7 to 14 in the illustrated example).

The H field 530, the B field 532, and the TU field can each contain one or more of the lower bits of the address of the destination device. The SID field 526 stores an eight-bit source ID. The SID uniquely identifies the source device in the network (e.g., the source chiplet).

The BTYPE field 542, which can represent an example of the BTYPE field 404, is a four-bit field that contains the bridge-type information identifying the type of the path information in the PATH field 514, as discussed above.

Extended command for the data packet 500 is stored in the EXCMD field 544, which is an eight-bit field that can be used to supplement the CMD field 522.

In each of the flits 503, 504, and 505, the CR/RSV field 536 is a four-bit field for credit returns. If the CP field 501 is enabled for credit return, the CR field provides data to return credit (e.g., indicate that a buffer from the transmitter can accept additional data). If the CP field 501 is not enabled for credit return, RSV indicates that the bits are reserved (e.g., for future use or other packet dependent purposes controlled by the CP field 501). In each of the flits 504 and 505, the BRIDGE/VENDOR field 546 contains information allowing for bridging between different protocols or standards (e.g., between the CPI and AXI), such as used by different vendors.

In each of flits 506 and 507, the CR/WEM field 548 is a four-bit field. If WEM is enabled, the CR/WEM field 548 indicates if each of the corresponding bytes of the 32 bits of data in the DATA field 550 is to be written. Thus, a single flit is always 36 bits in size, but may contain 0-32 bits of data to be written. If CR is enabled, two bits of the CR/WEM field 548 identify whether the credit return is for virtual channel 0, 1, 2, or 3 and the other two bits of the CR/WEM field 548 indicate whether the number of credits to be returned is 0, 1, 2, or 3.

Figure 6:
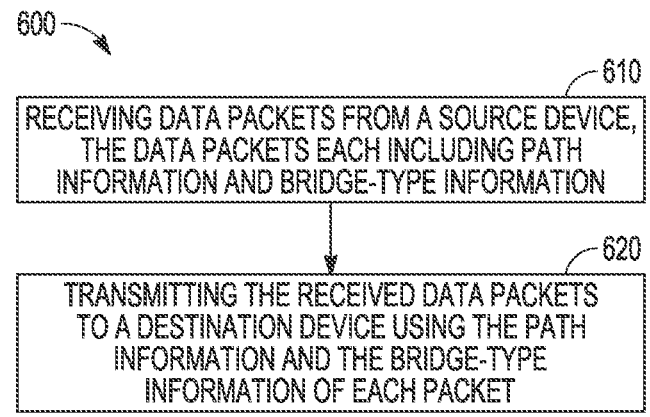
FIG. 6 is a flow chart showing operations of a method for determining a path for ordered packet transmission, in accordance with some embodiments of the present disclosure.

FIG. 6 is a flow chart showing operations of a method 600 for determining a path for ordered packet transmission, in accordance with some embodiments of the present disclosure. The method 600 can be performed for transmission of data packets between a source device and a destination device in a system including multiple electronic devices, such as chiplets, through an interface network connecting the multiple electronic devices to each other through various routes. In an example, the source device and/or the destination device are each a chiplet, and the interface network includes the CPI network as discussed in this disclosure. In an example, the multiple electronic devices include memory devices.

At 610, data packets are received from the source device. The data packets each include path information indicating a path to a destination device of the multiple electronic devices and bridge-type information indicating a type of the path information included. At 620, the received data packets are transmitted to the destination device using the path information and the bridge-type information of each packet of the received data packets. The bridge-type information in each data packet indicates whether the path information in that data packet is an address of the destination device (or a portion of the address) or a TID associated with that data packet. The data packets that have the same path information (i.e., the same address or the same TID) and the same bridge-type information are transmitted by ordered delivery to the destination device. In response to the bridge-type information indicating that the path information is the address, the data packets having the same address are transmitted in the order they are received to the destination device identified by the address (with additional address bits in one or more additional address fields when necessary). In response to the bridge-type information indicating that the path information is the TID, the data packets having the same TID are transmitted in the order they are received to the destination device identified by the address associated with the TID and contained in one or more address fields of each data packet.

Figure 7:
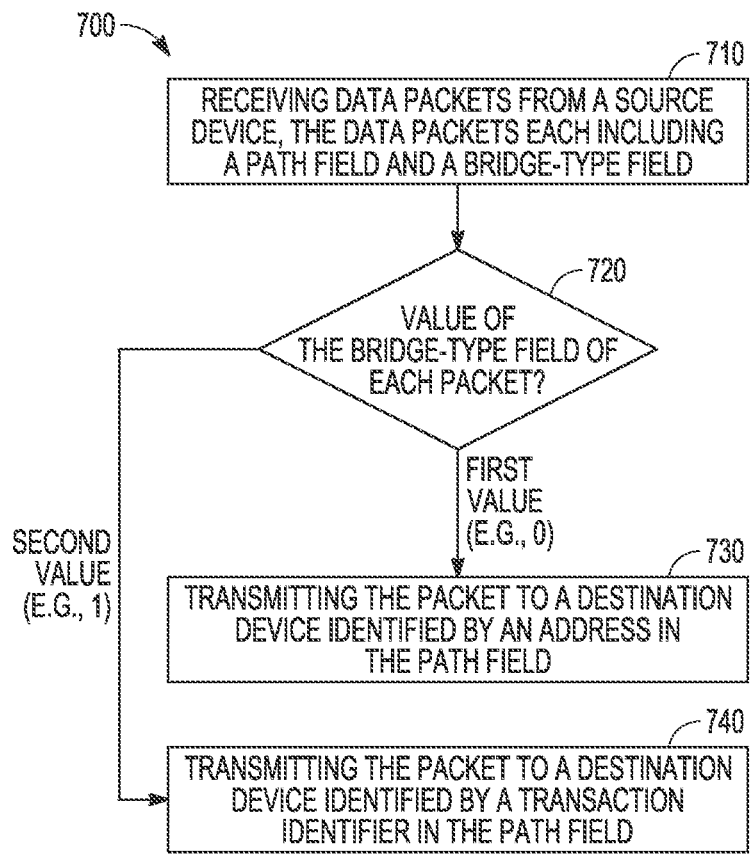
FIG. 7 is a flow chart showing operations of a method for determining a path for ordered packet transmission using path and bridge-type field values in each packet being transmitted, in accordance with some embodiments of the present disclosure.

FIG. 7 is a flow chart showing operations of a method 700 for determining a path for ordered packet transmission using path and bridge-type field values in each packet being transmitted, in accordance with some embodiments of the present disclosure. The method 700 can represent a further embodiment of the method 600 for transmitting the data packets between the source device and the destination device in the system including the multiple electronic devices, such as chiplets, through the interface network connecting the multiple electronic devices to each other through various routes.

At 710, data packets are received from the source device. The data packets each include a path field including path information indicating a path to a destination device of the multiple electronic devices and a bridge-type field including a bridge-type information indicating a type of the path information in the path field. An example of the data packets is the data packets 400, with the data packet 500 being a more specific example for use in the CPI network.

At 720, value of the bridge-type field for each received data packet is determined. In one example, the protocol field can have one of at least two values: a first value (e.g., 0) and a second value (e.g., 1). The first value indicates that the path information in the path field of the data packet is an address (or part of the address) of the destination device associated with the data packet. The second value indicates that the path information in the path field of the data packet is a TID associated with the data packet.

At 730, if the bridge-type field of the received data packet has the first value, the received data packet is transmitted to the destination device via a path identified by the address in its path field. The path field may contain part of the address of the destination device, with the remaining part of the address contained in one or more other fields of the data packets. The data packets having the same value (the address) in their path fields are transmitted to the destination device by ordered delivery. At 740, if the bridge-type field of the received data packet has the second value, the received data packet is transmitted via a path to the destination device identified by the TID in its path field. The address of the destination device is contained in one or more fields (other than the path field) of the data packets. The data packets having the same value (the TID) in their path fields are transmitted to the destination device by ordered delivery.

Figure 8:
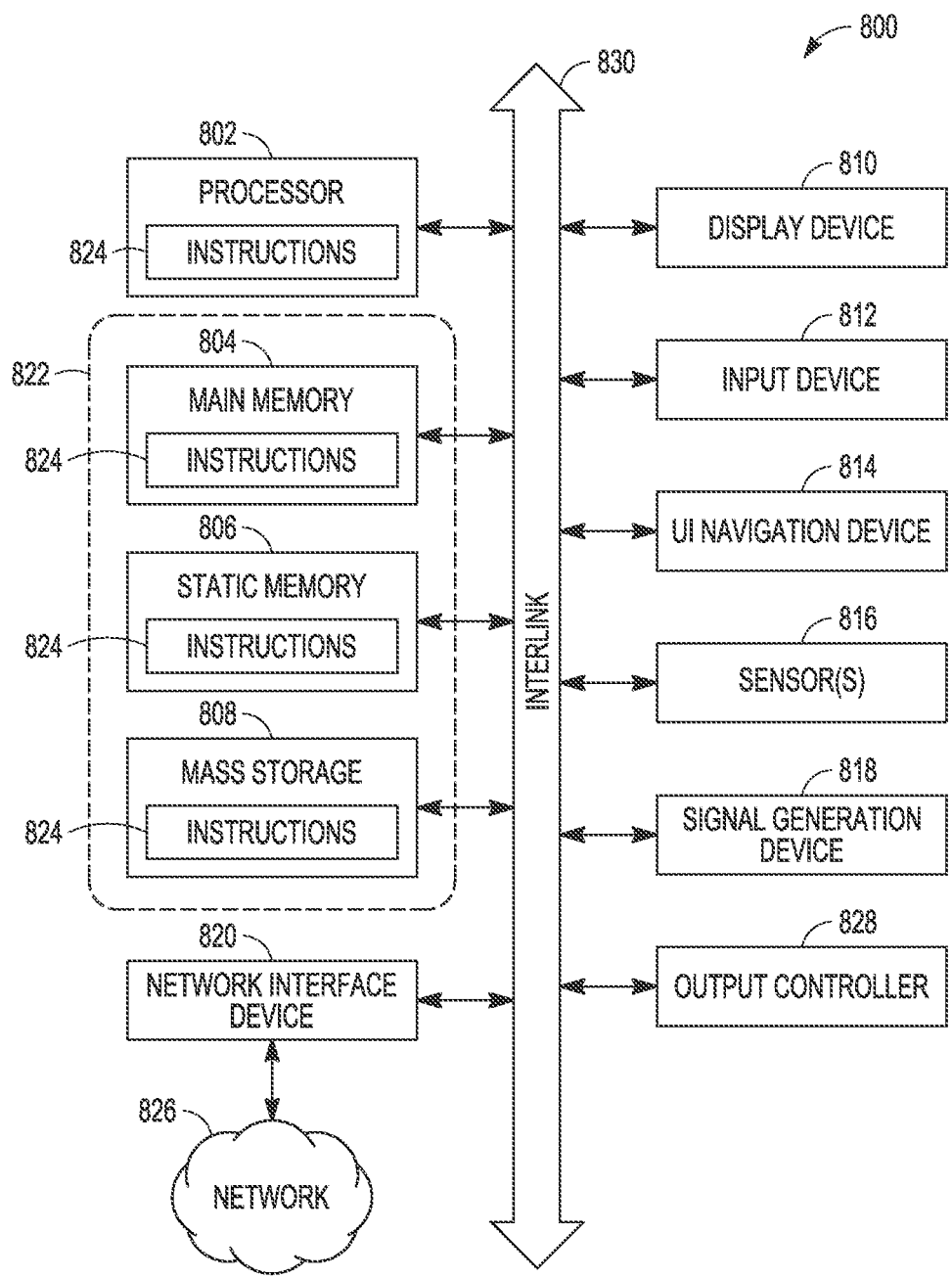
FIG. 8 is a block diagram of an example computer system in which embodiments of the present disclosure may operate.

FIG. 8 is a block diagram of an example machine 800 with which, in which, or by which any one or more of the techniques (e.g., the method 600 or the method 700) discussed herein can be implemented. Examples, as described herein, can include, or can operate by, logic or a number of components, or mechanisms in the machine 800. Circuitry (e.g., processing circuitry) is a collection of circuits implemented in tangible entities of the machine 800 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 800 follow.

In alternative embodiments, the machine 800 can operate as a standalone device or can be connected (e.g., networked) to other machines. In a networked deployment, the machine 800 can operate in the capacity of a server machine, a client machine, or both in server-client network environments. In an example, the machine 800 can act as a peer machine in peer-to-peer (P2P) (or other distributed) network environment. The machine 800 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 800 can include a hardware processor 802 (e.g., a central processing unit (CPU), a graphics processing unit (GPU), a hardware processor core, or any combination thereof), a main memory 804, a static memory (e.g., memory or storage for firmware, microcode, a basic-input-output (BIOS), unified extensible firmware interface (UEFI), etc.) 806, and mass storage 808 (e.g., hard drives, tape drives, flash storage, or other block devices) some or all of which can communicate with each other via an interlink (e.g., bus) 830. The machine 800 can further include a display unit 810, an alphanumeric input device 812 (e.g., a keyboard), and a user interface (UI) navigation device 814 (e.g., a mouse). In an example, the display unit 810, input device 812 and UI navigation device 814 can be a touch screen display. The machine 800 can additionally include a storage device (e.g., drive unit) 808, a signal generation device 818 (e.g., a speaker), a network interface device 820, and one or more sensors 816, such as a global positioning system (GPS) sensor, compass, accelerometer, or other sensor. The machine 800 can include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 802, the main memory 804, the static memory 806, or the mass storage 808 can be, or include, a machine-readable medium 822 on which is stored one or more sets of data structures or instructions 824 (e.g., software) embodying or utilized by any one or more of the techniques or functions described herein. The instructions 824 can also reside, completely or at least partially, within any of registers of the processor 802, the main memory 804, the static memory 806, or the mass storage 808 during execution thereof by the machine 800. In an example, one or any combination of the hardware processor 802, the main memory 804, the static memory 806, or the mass storage 808 can constitute the machine-readable media 822. While the machine-readable medium 822 is illustrated as a single medium, the term "machine-readable medium" can include a single medium or multiple media (e.g., a centralized or distributed database, or associated caches and servers) configured to store the one or more instructions 824.

The term "machine-readable medium" can include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine-readable media that do not include transitory propagating signals. Specific examples of non-transitory machine-readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine-readable medium 822 can be representative of the instructions 824, such as instructions 824 themselves or a format from which the instructions 824 can be derived. This format from which the instructions 824 can be derived can include source code, encoded instructions (e.g., in compressed or encrypted form), packaged instructions (e.g., split into multiple packages), or the like. The information representative of the instructions 824 in the machine-readable medium 822 can be processed by processing circuitry into the instructions to implement any of the operations discussed herein. For example, deriving the instructions 824 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 824.

In an example, the derivation of the instructions 824 can include assembly, compilation, or interpretation of the information (e.g., by the processing circuitry) to create the instructions 824 from some intermediate or preprocessed format provided by the machine-readable medium 822. The information, when provided in multiple parts, can be combined, unpacked, and modified to create the instructions 824. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 824 can be further transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 can include one or more physical jacks (e.g., Ethernet, coaxial, or phone jacks) or one or more antennas to connect to the communications network 826. In an example, the network interface device 820 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software. A transmission medium is a machine-readable medium.

In the foregoing specification, some example implementations of the disclosure have been described. It will be evident that various modifications can be made thereto without departing from the broader scope and spirit of the disclosure as set forth in the following claims. The specification and drawings are, accordingly, to be regarded in an illustrative sense rather than in a restrictive sense. Below is a non-exhaustive list of examples of implementations of the present disclosure. Throughout detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural, logical and electrical changes may be made without departing from the spirit and scope of the present invention. References to "an", "one", or "various" embodiments in this disclosure are not necessarily to the same embodiment, and such references contemplate more than one embodiment. The following detailed description provides examples, and the scope of the present invention is defined by the appended claims and their legal equivalents.

In Example 1, a method is provided. The method may include transmitting data between multiple electronic devices coupled to an interface network. The multiple electronic devices include multiple chiplets. The transmitting may include receiving data packets from a source device. The data packets may each include a path field including path information indicating a path to a destination device and a bridge-type field including a bridge-type information indicating a type of the path information in the path field. The source device and the destination device may each include a chiplet of the multiple chiplets. The transmitting may further include transmitting the received data packets to the destination device using the path information and the bridge-type information of each packet of the received data packets.

In Example 2, the data packets as found in Example 1 may optionally include commands for operating one or more memory devices of the multiple electronic devices.

In Example 3, the subject matter of transmitting the received data packets to the destination device as found in any one or any combination of Examples 1 and 2 may optionally include transmitting data packets of the received data packets that have a common value in the path fields to the destination device in an order by which the data packets are received from the source device.

In Example 4, the subject matter of transmitting the received data packets to the destination device as found in any one or any combination of Examples 1 to 3 may optionally include transmitting a first data packet of the received data packets to the destination device using an address in the path field of the first data packet. The first data packet have a value in the bridge-type field indicating an address in the path field, the address being at least a portion of the address of the destination device.

In Example 5, the subject matter of transmitting the received data packets to the destination device as found in any one or any combination of Examples 1 to 4 may optionally include transmitting a second data packet of the received data packets to the destination device using a transaction identifier in the path field of the second data packet, the second data packet having a value in the bridge-type field indicating a transaction identifier in the path field, the transaction identifier associated with the address of the destination device.

In Example 6, the data packets as found in any one or any combination of Examples 4 and 5 may optionally include an address/transaction identifier field including a value being the transaction identifier when the value in the bridge-type field indicates the address in the path field and the address when the value in the bridge-type field indicates the transaction identifier in the path field, and the subject matter of transmitting the received data packets to the destination device as found in any one or any combination of Examples 4 and 5 may optionally include transmitting a first data packet of the received data packets to the destination device using an address in the path field of the first data packet and transmitting a second data packet of the received data packets to the destination device using the address in the address/transaction identifier field of the second data packet. The first data packet has a value in the bridge-type field indicating an address in the path field. The address is at least a portion of the address of the destination device. The second data packet has a value in the bridge-type field indicating a transaction identifier in the path field. The transaction identifier is associated with the address of the destination device.

In Example 7, a system may include multiple electronic devices and multiple hardware transceivers. The multiple electronic devices may be coupled to each other via an interface network, and may include multiple chiplets. The multiple hardware transceivers, with at least one transceiver included in or coupled to a respective electronic device of the multiple electronic devices, may each be configured to receive data packets from a source device. The data packets may each include a path field including path information indicating a path to a destination device and a bridge-type field including bridge-type information indicating a type of the path information in the path field. The source device and the destination device may each include a chiplet of the multiple chiplets. The multiple hardware transceivers may each be further configured to transmit the received data packets to the destination device using the path information and the bridge-type information of each packet of the received data packets.

In Example 8, the subject matter of Example 7 may optionally be configured such that the multiple hardware transceivers are each configured to transmit data packets of the received data packets that have a common value in the path fields to the destination device in an order by which the data packets are received from the source device.

In Example 9, the subject matter of any one or any combination of Examples 7 and 8 may optionally be configured such that the multiple hardware transceivers are each configured to transmit a first data packet of the received data packets to the destination device using an address in the path field of the first data packet, the first data packet having a value in the bridge-type field indicating an address in the path field, the address being at least a portion of the address of the destination device.

In Example 10, the subject matter of Example 9 may optionally be configured such that the multiple hardware transceivers are each configured to transmit a second data packet of the received data packets to the destination device using a transaction identifier in the path field of the second data packet, the second data packet having a value in the bridge-type field indicating a transaction identifier in the path field, the transaction identifier associated with the address of the destination device.

In Example 11, the subject matter of Example 10 may optionally be configured such that the data packets each include an address/transaction identifier field including a value being the transaction identifier when the value in the bridge-type field indicates the address in the path field and the address when the value in the bridge-type field indicates the transaction identifier in the path field.

In Example 12, the subject matter of any one or any combination of Examples 7 to 11 may optionally be configured to include a memory device including the multiple electronics devices and the interface network, and such that the data packets each include a command field containing a memory access command.

In Example 13, a non-transitory machine-readable medium stores instructions that, when executed by a system, may cause the system to perform operations including: receiving data packets from a source device of multiple electronic devices including multiple chiplets and coupled to each other via an interface network, and transmitting the received data packets to a destination device using path information and bridge-type information of each packet of the received data packets. The data packets may each include a path field including the path information indicating a path to the destination device of the multiple electronic devices and a bridge-type field including the bridge-type information indicating a type of the path information in the path field. The source device and the destination device may each include a chiplet of the multiple chiplets.

In Example 14, the data packets as found in Example 13 may optionally include commands for operating a memory device including the multiple electronic devices.

In Example 15, the subject matter of transmitting the received data packets to the destination device as found in any one or any combination of Examples 13 and 14 may optionally include transmitting data packets of the received data packets that have a common value in the path fields to the destination device in an order by which the data packets are received from the source device.

In Example 16, the subject matter of transmitting the received data packets to the destination device as found in any one or any combination of Examples 13 to 15 may optionally include: transmitting a first data packet of the received data packets to the destination device using an address in the path field of the first data packet, and transmitting a second data packet of the received data packets to the destination device using a transaction identifier in the path field of the second data packet. The first data packet has a value in the bridge-type field indicating an address in the path field, the address being at least a portion of the address of the destination device. The second data packet has a value in the bridge-type field indicating a transaction identifier in the path field, the transaction identifier associated with the address of the destination device.

In Example 17, the data packets as found in Example 16 may optionally each include an address/transaction identifier field including a value being the transaction identifier when the value in the bridge-type field indicates the address in the path field and the address when the value in the bridge-type field indicates the transaction identifier in the path field.

In Example 18, a system may include multiple electronic devices and multiple hardware transceivers. The multiple electronic devices may be coupled to each other via an interface network, and include multiple chiplets. The multiple hardware transceivers, with at least one transceiver included in or coupled to a respective electronic device of the multiple electronic devices, may each be configured to perform operations including, at a selected electronic device, receiving first data packets from a first source device of the multiple electronic devices. The first data packets each include first path information indicating a first path to a first destination device of the multiple electronic devices and including first bridge-type information indicating a type of the first path information. The operations may further include: transmitting the received first data packets to the first destination device through a first path configuration, in response to the first path information and the first bridge-type information, and receiving second data packets from a second source device of the multiple electronic devices. The second data packets each include second path information indicating a second path to a second destination device of the multiple electronic devices and including second bridge-type information indicating a type of the second path information. The operations may further include transmitting the received second data packets to the second destination device through a second path configuration, in response to the second path information and the second bridge-type information. The first source device, the first destination device, the second source device, and the second destination device may each include a chiplet of the multiple chiplets.

In Example 19, the subject matter of Example 18 may optionally be configured such that the received first and second data packets each include a path field containing path information, the first data packets contain a first path value in the path field, and the second data packets contain a second path value in the path field.

In Example 20, the subject matter of Example 19 may optionally be configured such that the received first and second data packets each include a bridge-type field containing bridge-type information, the first data packets contain a first type value in the bridge-type field, and the second data packets contain a second type value in the bridge-type field.

In Example 21, the subject matter of Example 20 may optionally be configured such that the first type value indicates whether the first path value is a portion of an address of the first destination device or a portion of a transaction identifier associated with the first destination device, and the second type value indicates whether the second path value is a portion of an address of the second destination device or a portion of a transaction identifier associated with the second destination device.

What is claimed is:

1. A method, comprising:
   transmitting data using an interface network coupled to multiple electronic devices, the transmitting including:
   receiving data packets from a first device of the multiple electronic devices, the data packets each including a path field including path information indicating a path to a second device of the multiple electronic devices and a bridge-type field including bridge-type information indicating a type of the path information in the path field selected from multiple types of the path information, the multiple types including at least a non-address type for which the path information indicates the path to the second device without including a portion of an address; and
   transmitting each packet of the received data packets to the second device using the path information and the bridge-type information of that packet.

2. The method of claim 1, wherein the multiple electronic devices each comprise a chiplet.

3. The method of claim 1, wherein the multiple types of the path information further comprise an address type for which the path information comprises address information including at least a portion of an address of the second device.

4. The method of claim 3, wherein transmitting each packet of the received data packets to the second device comprises:
   determining a value in the bridge-type field of each packet;
   in response to the value indicating the address type, transmitting that packet to the second device using the address information in the path field of that packet; and
   in response to the value indicating the non-address type, transmitting that packet to the second device using a non-address information in the path field of that packet.

5. The method of claim 4, wherein the non-address information comprises a transaction identifier associated with an address of the second device.

6. The method of claim 1, wherein the non-address type comprises a transaction identifier type for which the path information comprises a transaction identifier associated with an address of the second device.

7. The method of claim 1, further comprising transmitting common-path packets of the received data packets to the second device in an order by which the common-path packets are received from the first device, the common-path packets having a common value in the path fields.

8. The method of claim 1, further comprising operating a system including one or more memory devices of the multiple electronic devices using commands contained in the received data packets.

9. A system comprising:
   multiple electronic devices;

an interface network coupled to each device of the multiple electronic devices; and multiple hardware transceivers each coupled to the interface network and configured to:

receive data packets from a first device of the multiple electronic devices, the data packets each including a path field including path information indicating a path to a second device of the multiple electronic devices and a bridge-type field including bridge-type information indicating a type of the path information in the path field selected from multiple types of the path information, the multiple types including at least a non-address type for which the path information includes information other than a portion of an address; and transmit each packet of the received data packets to the second device using the path information and the bridge-type information of that packet.

10. The system of claim 9, wherein the multiple electronic devices each comprise a chiplet.

11. The system of claim 10, wherein the interface network comprises an additional chiplet.

12. The system of claim 10, wherein the interface network is distributed in the chiplets of the multiple electronic devices.

13. The system of claim 10, wherein the multiple electronic devices each comprise a transceiver of the multiple hardware transceivers.

14. The system of claim 10, wherein the multiple electronic devices comprise memory devices.

15. The system of claim 10, wherein the multiple types of the path information further comprise an address type for which the path information comprises address information including at least a portion of an address of the second device, and the multiple hardware transceivers are each configured to transmit first and second packets of the received data packets to the second device, the first packets having a value in the bridge-type field indicating that the path field includes the address information, the second packets having a value in the bridge-type field indicating that the path field includes non-address information associated with the address of the second device without including a portion of the address of the second device.

16. A non-transitory machine-readable medium that stores instructions that, when executed by a system, cause the system to perform operations comprising:

transmitting data using an interface network coupled to multiple electronic devices, the transmitting including:

receiving data packets from a first device of the multiple electronic devices, the data packets each including a path field including path information indicating a path to a second device of the multiple electronic devices and a bridge-type field including bridge-type information indicating a type of the path information in the path field selected from multiple types of the path information, the multiple types including at least a non-address type for which the path information indicates the path to the second device without including a portion of an address; and transmitting each packet of the received data packets to the second device using the path information and the bridge-type information of that packet.

17. The non-transitory machine-readable medium of claim 16, wherein the multiple electronic devices each comprise a chiplet.

18. The non-transitory machine-readable medium of claim 16, wherein transmitting the data further comprises transmitting common-path packets of the received data packets to the second device in an order by which the common-path packets are received from the first device, the common-path packets having a common value in the path fields.

19. The non-transitory machine-readable medium of claim 16, wherein the multiple types further comprise an address type for which the path information comprises address information including at least a portion of an address of the second device.

20. The non-transitory machine-readable medium of claim 19, wherein transmitting each packet of the received data packets to the second device using the path information and the bridge-type information of that packet comprises:

determining a value in the bridge-type field of each packet;

in response to the value indicating the address type, transmitting that packet to the second device using the address information in the path field of that packet; and in response to the value indicating the non-address type, transmitting that packet to the second device using a non-address information in the path field of that packet.

* * * * *